United States Patent
Lin et al.

(10) Patent No.: US 6,813,642 B2
(45) Date of Patent: Nov. 2, 2004

(54) COMMUNICATION PROCESS BY CONNECTING SERVER END IN SERIES WITH SYSTEM UNDER VERIFICATION IN A NETWORK

(75) Inventors: Kuang-Shin Lin, Taipei (TW); Tong-S Chen, Taipei (TW); Zhen-Yu Hou, Tientsin (CN)

(73) Assignee: Inventec Corp., Taipei (TW)

( * ) Notice: Subject to any disclaimer, the term of this patent is extended or adjusted under 35 U.S.C. 154(b) by 773 days.

(21) Appl. No.: 09/726,319

(22) Filed: Dec. 1, 2000

(65) Prior Publication Data

US 2002/0069289 A1 Jun. 6, 2002

(51) Int. Cl.$^7$ ................................. G06F 15/16
(52) U.S. Cl. ................... 709/232; 709/236; 370/229; 370/401
(58) Field of Search ................. 709/205, 232, 709/231, 236; 713/201; 370/229, 401, 412; 710/29; 704/270

(56) References Cited

U.S. PATENT DOCUMENTS

| | | | | |
|---|---|---|---|---|
| 5,546,385 A | * | 8/1996 | Caspi et al. | 370/412 |
| 5,892,903 A | * | 4/1999 | Klaus | 713/201 |
| 6,012,084 A | * | 1/2000 | Fielding et al. | 709/205 |

OTHER PUBLICATIONS

FrameSaver SLV Network Access Module (NAM) Installation Instructions ; www.paradyne.com/technical_manuals/9000–A2–GN1J–20.pdf.*
Microsoft Word—AN704.doc ; www.epicentertech.net/java/Resources/Emb . . . ssor/app704.pdf.*
Configuring VLANs ; noc.caravan.ru/ciscocd/cc/td/doc/product . . . onfig/vlans.htm.*
Inside COM; Dale Rogerson, Microsoft, Distributed Computing Monitor, vol. 13 1997.*

* cited by examiner

Primary Examiner—Thong Vu
(74) Attorney, Agent, or Firm—Bacon & Thomas, PLLC

(57) ABSTRACT

A communication process by connecting a server end in series with a system under verification (SUV) in a network. The process initializes a communication port connected to server end and SUV and associated parameters through a computer in server end and SUV. Then creates a required thread and an associated interrupt program in server end and SUV respectively. When data has been received, the received data package is stored in an embedded buffer in server end or SUV until a complete data package is stored in the buffer. Next, data is transmitted through a predetermined data transmission module. By continuing this process, it is possible to transmit data by connecting server end in series with SUV through the connected communication port rather than network adapter. It is simple in operation and cost effective.

9 Claims, 5 Drawing Sheets

COMMUNICATION PROCESS BY CONNECTING SERVER END IN SERIES WITH SYSTEM UNDER VERIFICATION IN A NETWORK

FIELD OF THE INVENTION

The present invention relates to network communication and more particularly to a communication process by connecting server end in series with system under verification rather than through adapter in a network based environment.

BACKGROUND OF THE INVENTION

Conventionally, it is required to install a network adapter in each of server end and device (e.g., notebook computer) to be processed (hereinafter called system under verification (SUV)) in an assembly line. As such, the device in server end may be capable of performing a variety of tests on the SUV. However, the previous design is disadvantageous for being time consuming and tedious. To the worse, the cost of such design is relatively high in a mass production environment.

SUMMARY OF THE INVENTION

It is an object of the present invention to provide a communication process by connecting a server end in series with a system under verification (SUV) in a network. The process initializes a communication port connected to server end and SUV and associated parameters through a computer in server end and SUV. Then creates a required thread and an associated interrupt program in server end and SUV respectively. When data has been received, the received data package is stored in an embedded buffer in server end or SUV until a complete data package is stored in the buffer. Next, data is transmitted through a predetermined data transmission module. By continuing this process, it is possible to transmit data by connecting server end in series with SUV through the connected communication port rather than network adapter. It is advantageous for being simple and cost effective.

It is another object of the present invention to provide a communication process by connecting a server end in series with a system under verification in a network. When data has been received, the computer in server end or SUV determines whether the received data is complete based on the head of the data package. If not, process aborts. If yes, store the complete data in a receiving buffer. When the receiving of data has been completed a suitable processing is performed on the data package based on the data type thereof.

The above and other objects, features and advantages of the present invention will become apparent from the following detailed description taken with the accompanying drawings.

DETAILED DESCRIPTION OF THE PREFERRED EMBODIMENTS

Figure 1:
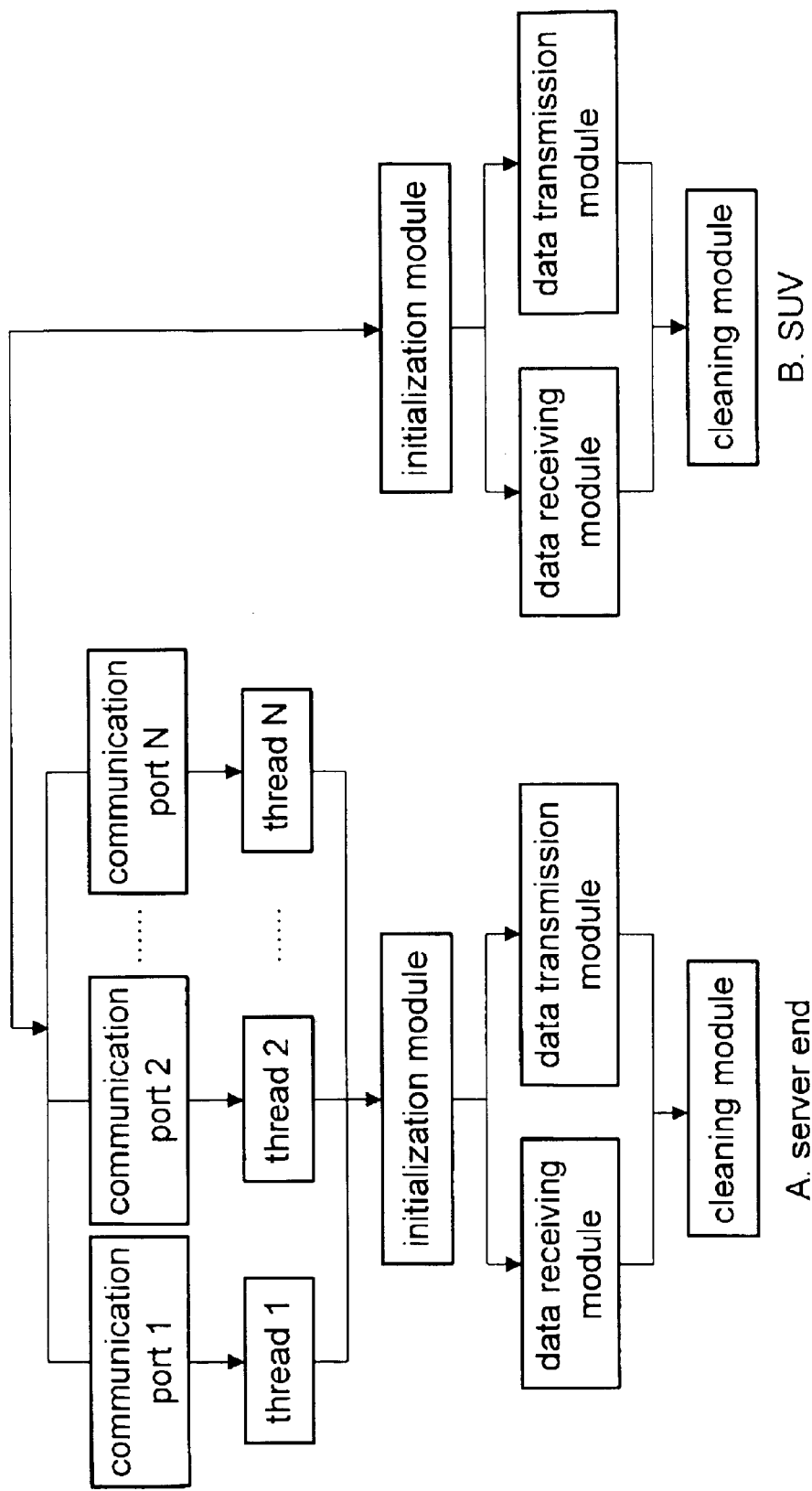
FIG. 1 is a block diagram illustrating a communication process by connecting server end in series with system under verification in a network according to the invention.

Referring to FIG. 1, there is shown a block diagram of a communication process by connecting a server end (e.g., server) in series with a system under verification (SUV) (e.g., device to be processed in an assembly line) in a network. Data is communicated between server and SUV. In sending data, first initialize a communication port n which is connected to server or SUV. Next, the computer will pack the data to be sent so as to be in compliance with a predetermined transmission protocol. Then send data to a predetermined buffer in data transmission module in server or SUV. Finally, data is sent. For example, as data sent from server to SUV, data is first sent to initialization module in the SUV. Then data is sent to data receiving module. The received data will be stored in a predetermined buffer prior to sending to cleaning module. Finally, associated head contained in data is deleted in cleaning module so as to obtain the original data sent from server. As in the case of data sent from SUV to server, data is first sent to initialization module in the server through one of a plurality of pairs of communication port n and thread n (where n is 1, 2, . . . N). Then data is sent to data receiving module. The received data will be stored in a predetermined buffer prior to sending to cleaning module. Finally, the associated head contained in data is deleted in cleaning module so as to obtain the original data sent from server. By continuing this process, it is possible to transmit data between server and SUV through connected communication port rather than through network adapter. It is advantageous for being simple and cost effective. Each of initialization module, data receiving module, and data transmission module is detailed below.

Figure 2A:
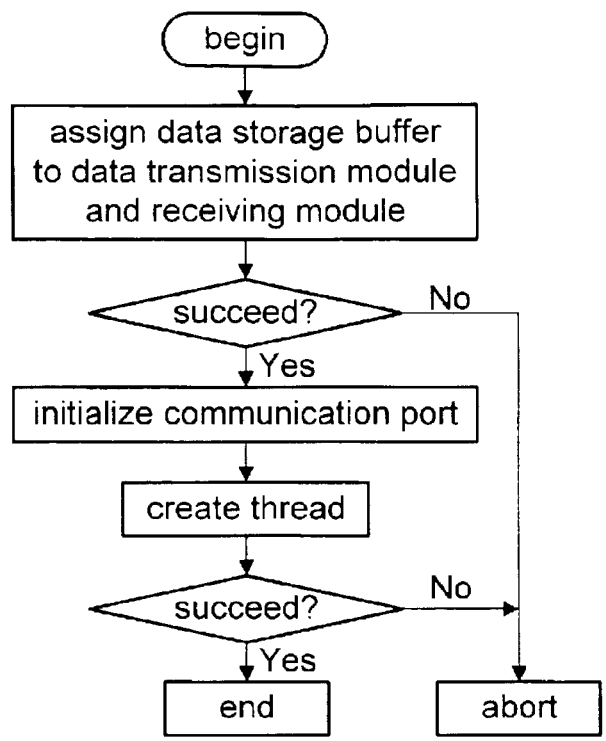
FIG. 2A is a flow chart diagram illustrating the steps performed in the initialization module of server end of FIG. 1.

Referring to FIG. 2A, there is shown a flow chart diagram illustrating the steps performed in the initialization module of server of FIG. 1. Computer is commanded to assign a data storage buffer in server to data transmission module and data receiving module respectively. Then it is determined whether the assignment is succeeded. If the assignment fails, process will abort immediately. Otherwise, a communication port is assigned to computer based on an embedded communication port parameter. Further, communication port is initialized immediately. Next, a storage associated with communication port is initialized based on a specified baud rate (i.e., data transfer rate). Then a thread is created. Finally, it is determined whether the initialization and thread creation are succeeded. If it fails, process will abort immediately. Otherwise, process will end normally.

Figure 2B:
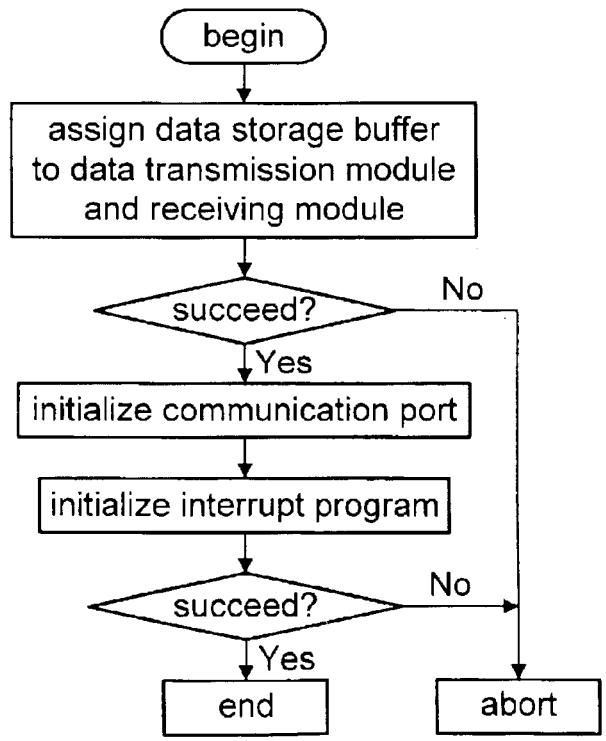
FIG. 2B is a flow chart diagram illustrating the steps performed in the initialization module of SUV of FIG. 1.

Referring to FIG. 2B, there is shown a flow chart diagram illustrating the steps performed in the initialization module of SUV of FIG. 1. Computer is commanded to assign a data storage buffer in server to data transmission module and data receiving module respectively. Then it is determined whether the assignment is succeeded. If the assignment fails, process will abort immediately. Otherwise, a communication port is assigned to computer based on an embedded communication port parameter. Further, communication port is initialized immediately. Next, a storage associated with communication port is initialized based on a specified baud rate (i.e., data transfer rate). Then an interrupt program is created based on the thread in server. Finally, it is determined whether the initialization and interrupt program creation are succeeded. If it fails, process will abort immediately. Otherwise, process will end normally.

Figure 3:
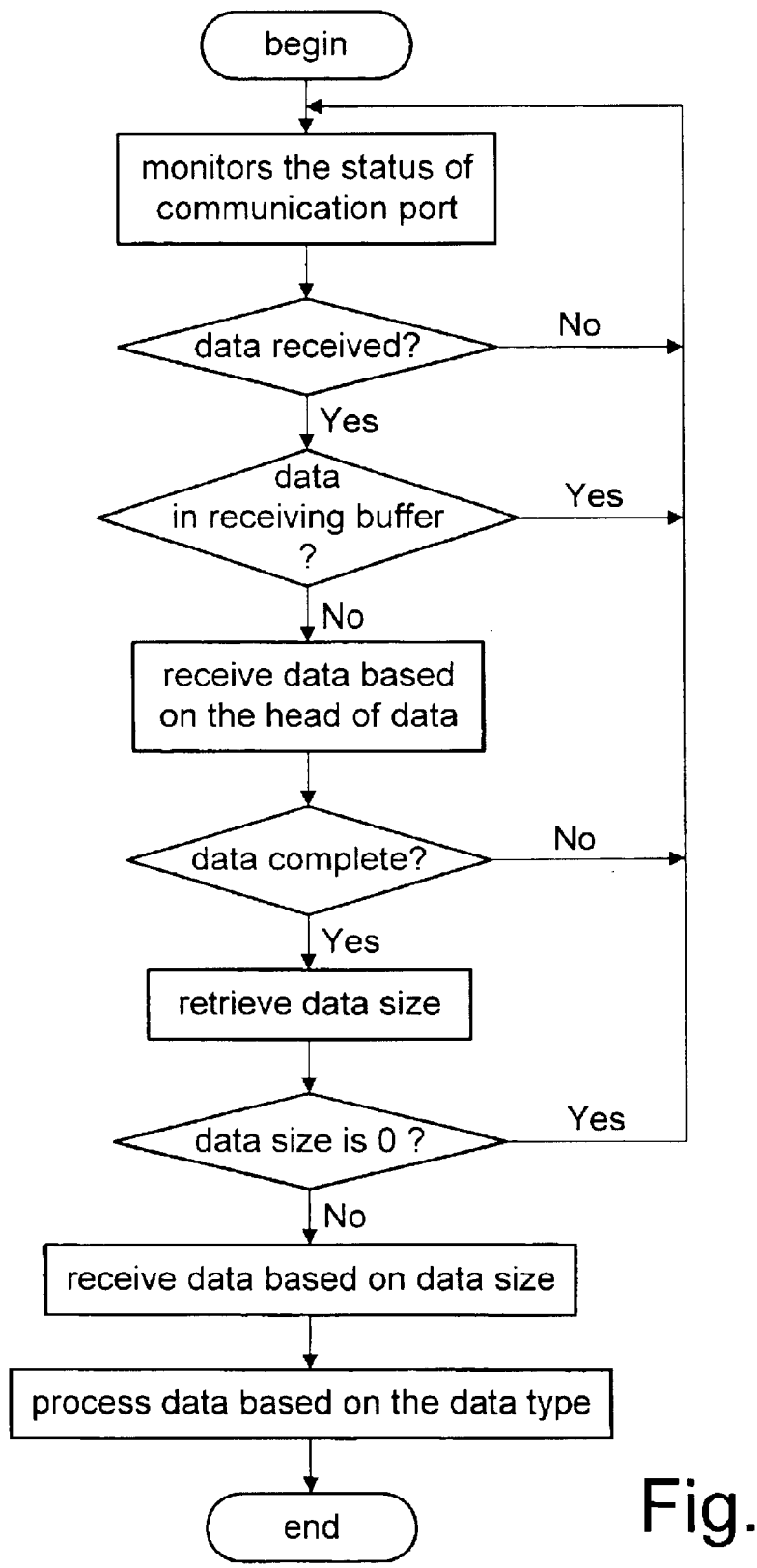
FIG. 3 is a flow chart diagram illustrating the steps performed in either the thread of FIG. 2A or the interrupt program of FIG. 2B.

Referring to FIG. 3, there is shown a flow chart diagram illustrating the steps performed in either the thread of FIG. 2A or the interrupt program of FIG. 2B. Computer in server or SUV continuously monitors the status of communication port connected to server and SUV for determining whether data has been transmitted to the communication port. If no data received, process returns to above monitoring step. If yes, search a complete data package in the receiving buffer. If yes, process returns to above monitoring step. If not, receive data based on the head (including flag, data type, check bits, and etc.) of the data package. Then it is determined whether the data package is complete (i.e., whether a set value is contained therein). If not, process returns to above monitoring step. If yes, retrieve the data size bit in order to know the size of the head and data, and the set value of the data package contained in the head. Then, it is determined whether the value of data is zero. If yes, process returns to above monitoring step. If not, receive data based on data size of the data package. Finally, perform a suitable processing on the data based on the data type thereof.

Figure 4:
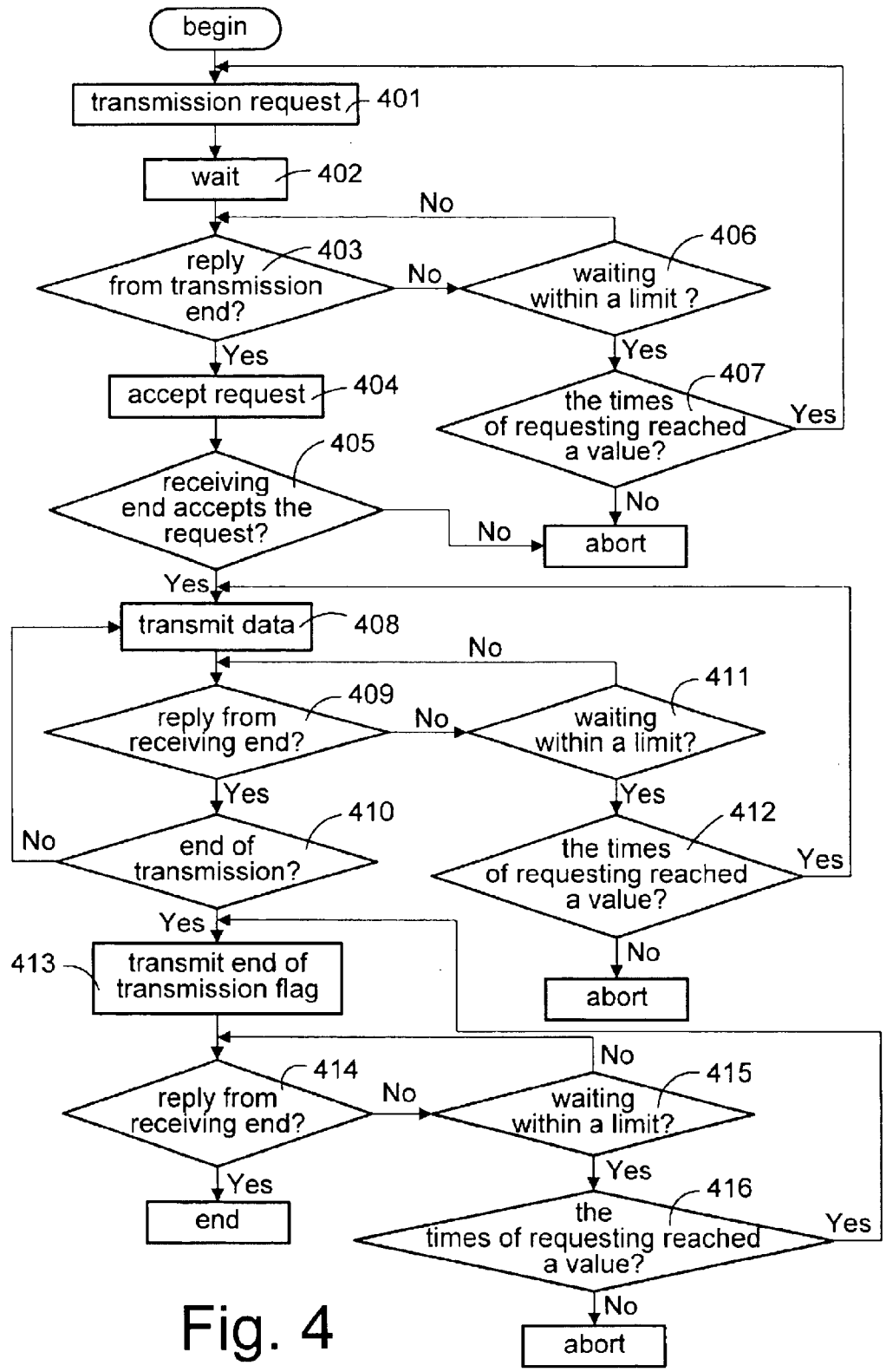
FIG. 4 is a flow chart diagram illustrating the process of sending data from server to SUV or from SUV to server.

Referring to FIG. 4, there is shown a flow chart diagram illustrating the process of sending data from server to SUV or from SUV to server. Computer in server or SUV may issue a transmission request to SUV or server (step 401). The computer is waiting a reply therefrom (step 402). Then it is determined whether there is a reply from server or SUV (step 403). If not, it is determined whether the waiting is within an acceptable limit (step 406). If the waiting is still within an acceptable limit, process loops back to step 403. If not, it is determined whether the times of requesting transmission has reached a predetermined value (step 407). If yes, process loops back to step 401 to start again. If not, process will abort immediately. Otherwise if there is a reply from server or SUV, computer will receive the request and transmit the message contained in the request to server or SUV for receiving (step 404). Next, it is determined whether the receiving end accepts the request (step 405). If not, process will abort immediately. If yes, computer begins to transmit data (step 408). Computer may determine whether there is a reply from the receiving end at the same time (step 409). If not, it is determined whether the waiting is within an acceptable limit (step 411). If the waiting is still within an acceptable limit, process loops back to step 409. If not, it is determined whether the times of requesting receiving has reached a predetermined value (step 412). If yes, process loops back to step 408. If not, process will abort immediately. Otherwise, if there is a reply from the receiving end, computer may determine whether the transmission has ended (step 410). If not, process loops back to step 408. If the transmission has ended, an end of transmission flag is sent to receiving end (step 413). Then it is determined whether there is a reply from receiving end with respect to the end of transmission flag (step 414). If no reply, it is then determined whether the waiting is within an acceptable limit (step 415). If the waiting is still within an acceptable limit, process loops back to step 414. If not, it is determined whether the times of requesting the receiving end to reply has reached a predetermined value (step 416). If yes, process loops back to step 413. If not, process will abort immediately. Otherwise, if there is a reply from the receiving end with respect to the end of transmission flag, process will end normally.

Figure 5:
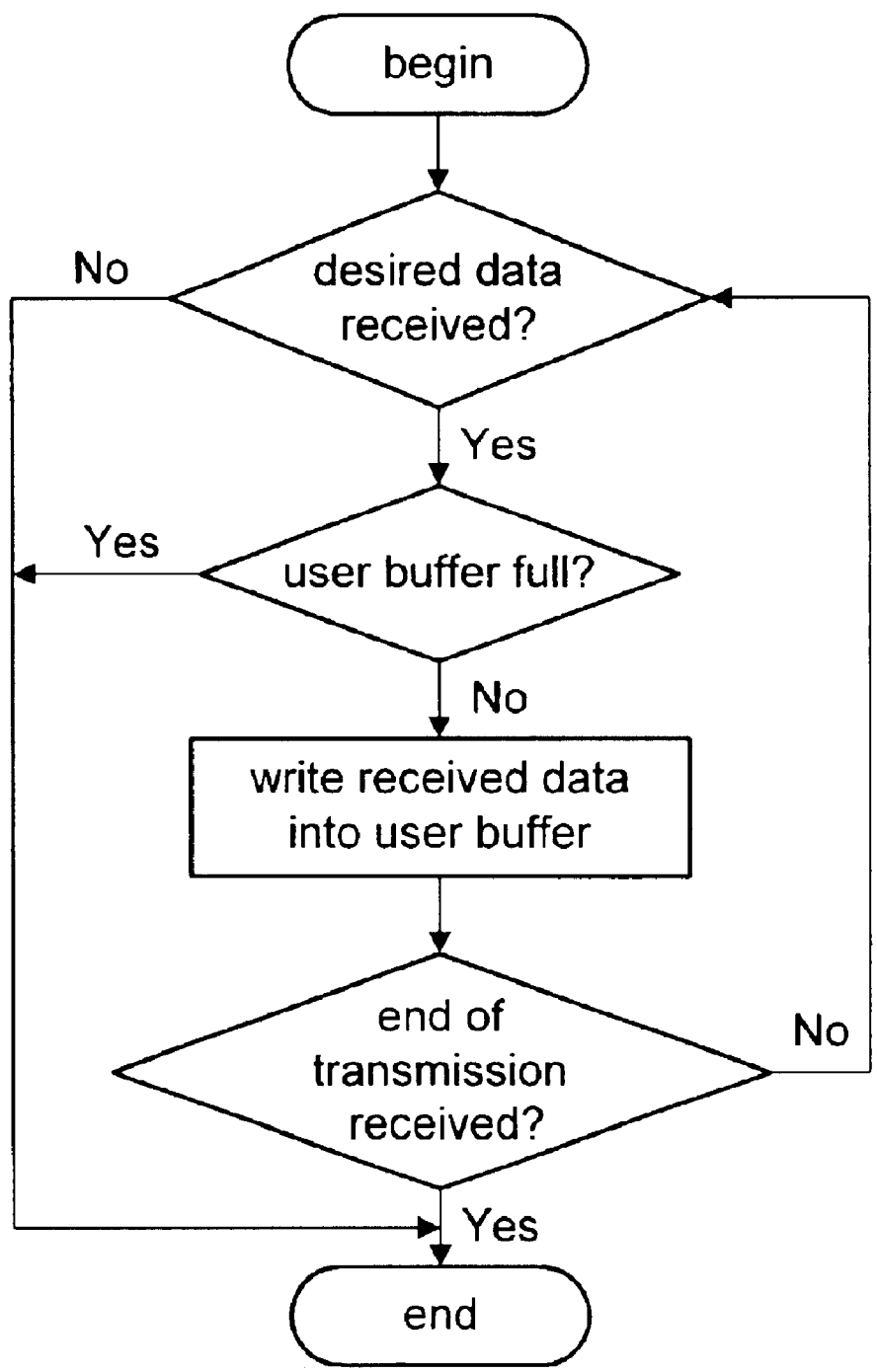
FIG. 5 is a flow chart diagram illustrating the process performed by server or SUV when data has been received.

Referring to FIG. 5, there is shown a flow chart diagram illustrating the process performed by server or SUV when data has been received. First, computer in server or SUV may determine whether the received data is in compliance with the data type contained in the data package. If not, process ends immediately. If yes, it is determined whether user buffer has been full. If yes, process ends immediately. If not, write the received data from the receiving buffer into the user buffer. Finally, it is determined whether end of transmission has been received. If yes, process ends immediately. If not, process loops back to beginning.

While the invention has been described by means of specific embodiments, numerous modifications and variations could be made thereto by those skilled in the art without departing from the scope and spirit of the invention set forth in the claims.

What is claimed is:

1. A communication process for enabling a server end to communicate with a system under verification (SUV) in a network by connecting the server end in series with, the communication process comprising the steps of:

(a) initializing a communication port connected to the server end and the SUV through an initialization module in each of the server end and the SUV by a computer in one of the server end and the SUV;

(b) processing data to be sent prior to sending to a predetermined buffer in a data transmission module in one of the server end and the SUV;

(c) sending data to a data receiving module of the other connected one of the server end and the SUV through the predetermined buffer in the data transmission module in one of the server end and the SUV;

(d) storing the received data in a predetermined buffer in the data receiving module in the other one of the server end and the SUV and only sending the data from the data receiving module to a cleaning module when a complete data package has been stored;

(e) causing the cleaning module to delete an associated head contained in the data so as to obtain the original data sent therefrom; and (f) continuing to perform the steps (a)–(e) for transmitting data between the server end and the SUV through the connected communication port.

2. The communication process of claim 1, wherein in performing the step of initialization through the initialization module in the server end in step (a), the process further comprises the steps of commanding the computer to assign a data storage buffer in the server end to the data transmission module and the data receiving module respectively, determining whether the assignment has succeeded such that if the assignment fails, aborting the process and otherwise assigning the communication port to the computer based on an embedded communication port parameter, initializing the communication port and a storage associated with the communication port, creating a thread, and determining whether the initialization and thread creation have succeeded, wherein if the initialization and thread creation have succeeded, the process ends normally and if the the initialization and thread creation have not succeeded, the process aborts.

3. The communication process of claim 1, wherein in performing the step of initialization through the initialization module in the server end in step (a), the process further comprises the steps of commanding the computer to assign a data storage buffer in the server end to the data transmission module and the data receiving module respectively, determining whether the assignment has succeeded such that if the assignment fails, aborting the process and otherwise assigning the communication port to the computer based on an embedded communication port parameter, initializing the communication port and a storage associated with the communication port, creating an interrupt program based on a thread in the server end, and determining whether the initialization and a thread creation have succeeded, wherein if the initialization and thread creation have succeeded, the process ends normally and if the the initialization and thread creation have not succeeded, the process aborts.

4. The communication process of claim 3, wherein in processing the thread and the interrupt program the computer in each of the server end and the SUV, the process further comprises the steps of continuously monitoring the status of the communication port connected to the server end and the SUV for determining whether data has been transmitted to the communication port, if no data has been received, returning to the monitoring step and if data has been received, searching a complete data package in the predetermined buffer in the data receiving module, if there is a complete data package, the process returns to the monitoring step, if there is no complete data package, the process receives data based on the head contained in the data package, determining whether a set value is contained in the data package, if not, returning to the monitoring step, if yes, retrieving a data size bit in the data package for determining whether the set value of the data package is equal to 0, if the set value is equal to 0, to the monitoring step, if the set value is not equal to zero, receiving data based on the data size bit of the data package, and performing a processing on the data based on a data type thereof.

5. The communication process of claim 1, wherein in the step (c) of sending data to a data receiving module of the other connected one of the server end and the SUV, the process further comprises the steps of commanding the computer in one of the server end and the SUV to issue a transmission request to the other connected one of the server end and the SUV and waiting for a reply, determining whether there is a reply, if there is a reply, commanding the computer to receive the request and transmit the message contained in the request to the other connected one of the server end and the SUV for receiving, determining whether the request is accepted by the receiving end, if not aborting the process, if the request is accepted, commanding the computer to transmit data, the computer determining whether there is a reply from the receiving end simultaneously, if there is a reply from the receiving end simultaneously, commanding the computer to determine whether the transmission has ended, if the transmission has not ended, the process looping back to the data transmission step, if the transmission has ended, an end of a transmission flag is sent to the receiving end, and determining whether there is a reply from the receiving end with respect to the end of the transmission flag, if there is a reply from the receiving end with respect to the end of hte transmission flag, ending the process normally.

6. The communication process of claim 5, wherein in commanding the computer in one of the server end and the SuV to issue a transmission request to theother connected one of the server end and the SUV and waiting for a reply, if there is no reply the process further comprises the steps of determining whether the waiting is within a predetermined limit, if the waiting is within the predetermined limit, the process loops back to the waiting state, if not determining whether the time of requesting transmission have reached a predetermined value, if yes, the process loops back to the transmission request step, if not, the process aborts.

7. The communication process of claim 5, wherein in commanding the computer to transmit data, if the computer determines there is no reply from the receiving end the process further comprises the steps of determining whether the waiting is within a predetermined limit, if the waiting is within the predetermined limit, the process loops back to the waiting state, if not, determining whether the times of requesting transmitting data have reached a predetermined value, if yes, the process loops back to the data transmission step, if not, the process aborts.

8. The communication process of claim 5, wherein in sending the end of the transmission flag the process further comprises the steps of determining whether the waiting is within a predetermined limit, if the waiting is whin the predetermined limit, the process loops back to the waiting state, if not, determining whether the times of requesting sending the end the transmission flag have reached a predetermined value, if yes, the process loops back to the step of requesting sending of the end of the transmission flag, if not, the process aborts.

9. The communication process of claim 1, wherein when data sent from the other connected one of the server end and the SUV is received by one of the server end and the SUV, the process further comprises the steps of the computer in one of the server and the SUV determining whether the received data is in compliance with the data type contained in the data package, if not, the process ends, if yes , determining whether a predetermined user buffer is full, if yes, the process ends, if not, the process writes the received data from the predetermined buffer in the data receiving module into the predetermined user buffer, and determining whether the end of transmission has been received if yes, the process ends and if not, the process loops back to the step of determining whether the received data is in compliance with the data type contained in the data package.

* * * * *